United States Patent [19]

Iwao et al.

[11] Patent Number: 5,028,832
[45] Date of Patent: Jul. 2, 1991

[54] ULTRASONIC MOTOR HAVING ANISOTROPIC PROPERTIES

[75] Inventors: Naoto Iwao, Nagoya; Shoji Yamada, Chita; Masaki Yamaguchi, Gifu, all of Japan

[73] Assignee: Brother Kogyo Kabushiki Kaisha, Nagoya, Japan

[21] Appl. No.: 512,824

[22] Filed: Apr. 23, 1990

[30] Foreign Application Priority Data

May 25, 1989 [JP]  Japan .................................. 1-132066

[51] Int. Cl.⁵ .......................................... H01L 41/08
[52] U.S. Cl. .................................................. 310/323
[58] Field of Search ................................ 310/323, 328

[56] References Cited

U.S. PATENT DOCUMENTS 4,752,711  6/1988  Tsukimoto et al. .................. 310/323

FOREIGN PATENT DOCUMENTS 0209865  1/1987  European Pat. Off. ............ 310/323
0022479  2/1985  Japan .................................. 310/323
63-136986  9/1988  Japan .

Primary Examiner—Mark O. Budd
Attorney, Agent, or Firm—Oliff & Berridge

[57] ABSTRACT

An ultrasonic motor includes an anisotropic layer disposed between an ultrasonic vibrator and a movable member. The anisotropic layer is made of a composite material including plural components. The ratio of the modulus of transverse elasticity of the layer to the modulus of longitudinal elasticity of the layer in the pressing direction of the movable member is smaller than the corresponding ratio of moduli for each of the components.

19 Claims, 2 Drawing Sheets

ULTRASONIC MOTOR HAVING ANISOTROPIC PROPERTIES

BACKGROUND OF THE INVENTION

1. Field of the Invention

The present invention relates to an ultrasonic motor in which an ultrasonic vibrator is pressed against a movable member with an anisotropic layer therebetween, whereby a force resulting from ultrasonic vibration generated in the ultrasonic vibrator is transmitted to the movable member by means of friction between the contact surfaces of the ultrasonic vibrator and the movable member to move the movable member.

2. Description of the Related Art

Basically, a movable member in an ultrasonic motor is moved by action of ultrasonic vibration generated in an ultrasonic vibrator. More specifically, every mass point of the ultrasonic vibrator in contact with the movable member repeats microscopic elliptical motion and the movable member strongly pressed against such ultrasonic vibrator is continuously driven by a friction force produced by action of the elliptical motion between the contact surfaces of the ultrasonic vibrator and the movable member.

Transmission efficiency of the driving force from the ultrasonic vibrator to the movable member is effected by various physical conditions. Such physical conditions include each modulus of elasticity of the ultrasonic vibrator and the movable member and the coefficient of friction on the contact surfaces.

SUMMARY OF THE INVENTION

The inventors have analyzed the forces acting between the ultrasonic vibrator and the movable member. For simplicity, explanation of elastic deformation, which occurs inside the ultrasonic vibrator, will be omitted.

The ultrasonic vibrator exerts a driving force, which results from elliptical motion of each mass point thereof, on the movable member obliquely to the contact surfaces. On the other hand, the movable member exerts a reaction force on the ultrasonic vibrator in the direction opposite to the driving force. When considering the driving force divided into its vertical component with respect to the contact surfaces (hereinafter to be called "vertical component of the driving force") and its component parallel to the contact surfaces (hereinafter to be called "horizontal component of the driving force"), it is known that microscopic elastic deformation due to the vertical component of the driving force is produced in the movable member in the same direction as the vertical component. When the degree of the deformation is very large, the movable member absorbs the force from the ultrasonic vibrator, whereby the movable member is not effectively driven, or, in some cases, it virtually becomes unable to move. Therefore, to reliably drive the movable member, such a condition is required that the modulus of longitudinal elasticity of the movable member is over a predetermined value.

On the other hand, a friction force due to the horizontal component of the driving force from the ultrasonic vibrator occurs between the contact surfaces. When the horizontal component of the driving force is smaller than the maximum friction force between the contact surfaces, the movable member is driven in the same direction as the horizontal component of the driving force without causing any slide. Therefore, to increase the coefficient of friction between the contact surfaces is one of the effective conditions for improving the transmission efficiency of the driving force.

For the reasons as described above, it has been practiced in prior art ultrasonic motors that a friction plate having a large coefficient of friction and high abrasion resistance is attached onto the contacting surface of the movable member so that the force transmitted to the movable member by means of the friction between the contact surfaces is increased. An example using a composite plastic material including a homogeneous blend of inorganic powders, fibers, and resin as a friction plate having high abrasion resistance is disclosed in Japanese Patent Laid-Open Application No. 136986/1988.

However, a force causing the portion of the movable member to deform in the vicinity of the contact surface, i.e., a shear force, is also generated due to the horizontal component of the driving force. Therefore, a drag force occurs in the vicinity of the contact surface of the movable member due to its recovery from the deformation caused by the shear force. The magnitude of the drag force is equal to a value of the modulus of shear elasticity (modulus of transverse elasticity) of a material used for forming the movable member multiplied by the degree of the deformation due to the shear force. The direction of the drag force is opposite to the friction force. Therefore, to lessen the modulus of shear elasticity thereby suppressing occurrence of sliding between the contact surfaces is considered to be also one of the effective methods to improve the transmission efficiency of the driving force.

Generally, the modulus of longitudinal elasticity and the modulus of transverse elasticity are values inherent in each material and are proportional to each other. Hence, in the prior art, when a material having a sufficiently large modulus of longitudinal elasticity to meet the above described condition has been selected for the movable member, the modulus of transverse elasticity thereof has inevitably become large. Therefore, in prior art movable members, it has been impossible to reduce the drag force due to the shear force.

In the case of the above mentioned composite plastic material disclosed in Japanese Patent Laid-open No. 136986/1988, though the material is a composite material, it is considered equivalent to a noncomposite material in terms of physical properties with respect to elasticity, because fibers and inorganic powders are uniformly dispersed in a resin, thereby making the material virtually homogeneous. Therefore, in the same way as with the above described prior art movable members, it has been impossible to reduce the drag force due to the shear force in the case of using such material.

Accordingly, it is an object of the present invention to provide an ultrasonic motor wherein a sliding loss is reduced so as to improve output efficiency.

According to the present invention, there is provided an ultrasonic motor comprising: an ultrasonic vibrator for generating an ultrasonic vibration, said ultrasonic vibrator having a contact surface; a movable member having a contact surface pressed against said contact surface of said ultrasonic vibrator in a pressing direction of the movable member; a layer made of a composite material including plural components and provided on at least one of the contact surfaces of said ultrasonic vibrator and said movable member, wherein a ratio of a modulus of transverse elasticity of said layer to a modulus of longitudinal elasticity of said layer relative to the pressing direction of said movable member is smaller than the corresponding ratio of moduli for each of said components.

BRIEF DESCRIPTION OF THE DRAWINGS

The above and other objects, features, and advantages of the present invention will become more apparent from reading the following description of the preferred embodiments taken in connection with the accompanying drawings, in which.

DETAILED DESCRIPTION OF THE PREFERRED EMBODIMENTS

Figure 1:
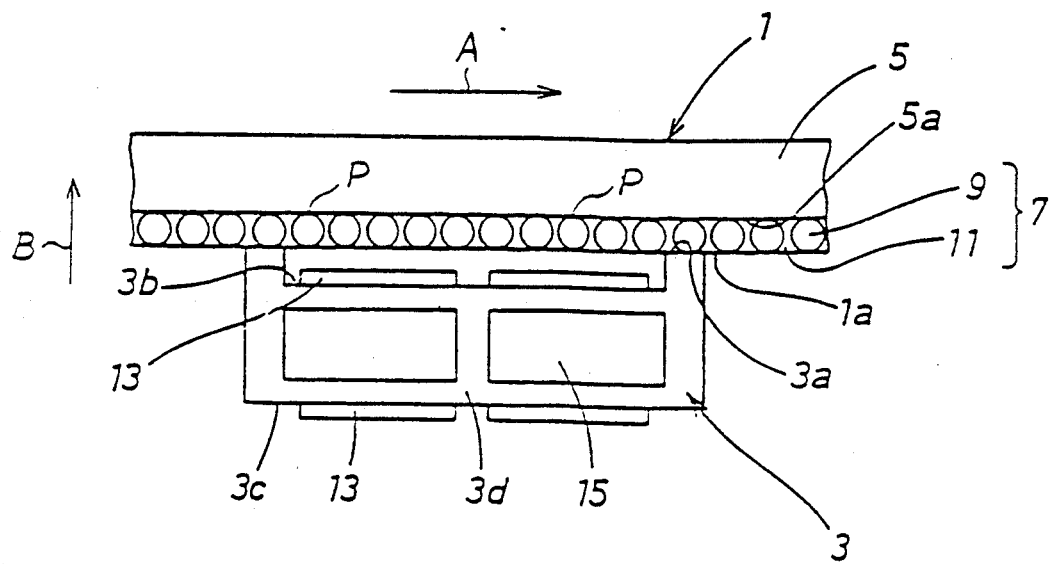
FIG. 1 is a side view of an ultrasonic motor in a preferred embodiment to the present invention.
Figure 2:
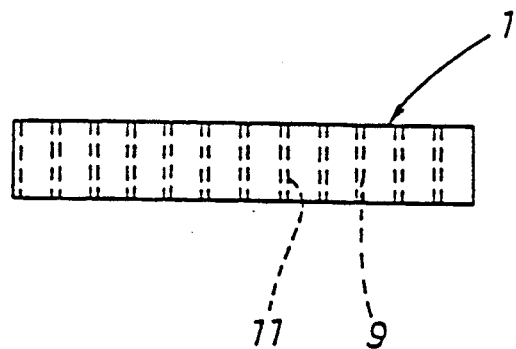
FIG. 2 is a bottom view of a movable member shown in FIG. 1.

FIG. 1 is a side view of an ultrasonic motor in a preferred embodiment according to the present invention and FIG. 2 is a bottom view of a movable member in the ultrasonic motor.

The ultrasonic motor, as shown in FIG. 1, is of a linear type, in which an ultrasonic vibrator 3 is pressed against the bottom face 1a of an elongated movable member 1. The ultrasonic vibrator 3 is adapted such that a force in the traveling direction of the movable member 1 (arrow A in FIG. 1) due to elliptical motion of mass points taking place on the top face 3a of the ultrasonic vibrator 3, is transmitted to the movable member 1 through friction between the top face 3a and the bottom face 1a of the movable member 1 so that the movable member 1 is allowed to travel in its longitudinal direction.

The movable member 1 is an elongated member having a rectangular cross-section and it is made up of a body 5 and a layer 7 with anisotropy provided on the bottom face 5a of the body 5.

The body 5 is formed of a metallic material or the like and provided with a hardness necessary for obtaining a friction force of a predetermined magnitude without bending too much when subjected to vibration of the ultrasonic vibrator 3.

The anisotropic layer 7, as shown in the side view of FIG. 1 and the bottom view of FIG. 2, is formed of a plurality of elements, preferably slender cylindrical rods 9 each having an axis arranged perpendicular to the traveling direction (represented by arrow A in FIG. 1) of the movable member 1 with a small gap therebetween and a high polymeric material such as a resin material 11 filled in the gaps. The layer 7 is bonded to the bottom face 5a of the body 5. As the material for the rods 9, a material having high modulus of elasticity and hardness such as ceramic and glass fiber is generally used. As the resin material 11 to be filled in the gaps, such a material as phenol resin having lower modulus of elasticity and lower hardness than the rod 9 is used. The ratio of the moduli of longitudinal elasticity (Young's modulus) between ceramics and phenol is substantially 10:1. The ratio of the moduli of transverse elasticity for ceramics and phenol is comparable to the ratio of moduli of longitudinal elasticity (e.g., approximately 10:1). With this composite structure, the layer 7 as a whole has a ratio of its modulus of transverse elasticity to its modulus of longitudinal elasticity in the pressing direction of the movable member 1 (direction of its thickness as represented by arrow B in FIG. 1) smaller than the corresponding ratio of moduli for each of the rods 9 and the resin material 11 constituting the layer 7.

More specifically, since the force exerted on the layer 7 in the direction B of its thickness is chiefly borne by the rods 9, the modulus of longitudinal elasticity of the layer 7 as a whole becomes a value close to that of the rod 9. On the other hand, though the force exerted on the layer 7 in its longitudinal direction is chiefly borne by the rods 9, since the resin material 11 is filled in the gaps between the rods 9, the resin material 11 elastically deforms before the rods 9 elastically deform due to the shear force. In other words, the force applied to the layer 7 in its longitudinal direction is mainly absorbed by the resin material 11. Hence, the modulus of shear elasticity of the layer 7 as a whole becomes a value close to that of the resin material 11. Consequently, as for the elastic property of the layer 7 as a whole, the modulus of longitudinal elasticity is changed to that of the rods 9, but the modulus of transverse elasticity is sufficiently lowered as compared with the case where the layer 7 is formed only of the material of the rods 9 (ceramics, for example). Further, the rods 9 are capable of pivoting movement when subjected to a longitudinal force. In other words, a longitudinal force tends to pivot the rods 9 in the longitudinal traveling direction A about a point P contacting the bottom face 5a of the body 5 of the movable member 1. By arranging the rods 9 to pivot in the longitudinal traveling direction A of the layer 7 as in the present embodiment, the longitudinal force applied to the rods 9 can be easily shifted to the resin material 11.

The ultrasonic vibrator 3 is made of a material (aluminum, in the present invention) having a predetermined modulus of elasticity and shaped into a predetermined form so that elliptical motion of the mass points is energized by: (a) bending vibrations in the vertical direction caused by means of piezoelectric elements 13 attached to the top face 3b and bottom face 3c of the body; and (b) stretching vibrations in the horizontal direction caused by means of piezoelectric elements 15 attached to both side faces 3d of the body. These piezoelectric elements 13 and 15 are supplied with alternating currents of a predetermined frequency at predetermined phase difference from a power source (not shown).

In the ultrasonic motor of the embodiment constituted as described above, the mass points on the top face 3a of the ultrasonic vibrator 3 are caused to move in an elliptical motion by means of the piezoelectric elements 13 and 15 so that each of the mass points is brought into contact with the bottom face 1a of the movable member 1 for a very short period of time so as to repetitively move the movable member 1 by a minute distance every time, whereby the movable member 1 is allowed to continuously travel.

The magnitude of the driving force which each mass point on the top face 3a of the ultrasonic vibrator transmits to the movable member 1 at that time is proportional to the pressing force exerted on the movable member 1 by the mass point. Due to the driving force transmitted by the ultrasonic vibrator 3 and the load applied to the movable member 1, a pair of large forces opposite to each other acts on the contact surfaces of the ultrasonic vibrator 3 and the movable member 1. Due to these forces, a great shear force acts on the layer 7 on the movable member 1 whereby the layer 7 is deformed in the traveling direction A of the movable member. Although this deformation generates a drag force in the same direction as the reaction force generated in the movable member 1 due to the driving force, the magnitude of the drag force does not become so great because it is a function of the modulus of transverse elasticity of the layer 7 multiplied by the degree of the slight deformation produced in the contacting period of the ultrasonic vibrator 3 and the movable member 1.

Accordingly, the sum of the reaction force to the driving force in the movable member 1 and the drag force generated in the layer 7 as described above does not exceed the limiting value up to which the movable member 1 and the ultrasonic vibrator 3 slide on each other, that is, a value of the coefficient of static friction between the two members multiplied by the pressing forces of the two members. Hence, the slide between the movable member 1 and the ultrasonic vibrator 3 is diminished and the output loss resulting from the sliding is reduced. An elastic energy stored due to the deformed layer 7 is smoothed with time lag and turned into a driving force acting on the movable member 1.

According to the ultrasonic motor of the present embodiment, since the anisotropic layer 7 formed of the rods 9 and the resin material 11 is provided on the bottom face of the movable member 1, the force transmitted by the friction generated on the contact surfaces of the ultrasonic vibrator 3 and the movable member 1 can be kept large while reducing the occurrence of slide between the contact surfaces of the ultrasonic vibrator 3 and movable member 1. Thus, a good effect is obtained in that a higher output efficiency than ever can be achieved. Further, since the slide hardly occurs, operation of the motor can be stabilized and, in addition, the wear of the ultrasonic vibrator 3 and the movable member 1 can be reduced.

Furthermore, since the modulus of elasticity of the layer 7 can be adjusted relatively easily by changing the proportions of the rods 9 and the resin material 11, a higher degree of freedom in design can be obtained and the ratio of the modulus of transverse elasticity to the modulus of longitudinal elasticity most suitable for an applied ultrasonic motor can be obtained.

Besides, since the ultrasonic motor of the present embodiment is such that the layer 7 (having its ratio of moduli of elasticity adjusted) is bonded to the movable member 1, the same ultrasonic motor design as practiced before can be used for providing optimum conditions for preventing resonance of the movable member 1, etc. and optimum conditions for achieving effective vibration of the ultrasonic vibrator 3, etc. By utilizing a vibrational condition or the like of the layer 7, better operating conditions can be achieved, and thus, such an effect is obtained that the degree of freedom in design can be improved.

While the invention has been described in the foregoing with reference to a particular embodiment, it will be apparent that various changes in form and detail may be made without departing from the spirit and scope of the invention. For example, the present invention can be applied to either of progressive wave type motors and standing wave type motors. It can be applied not only to motors of a linear type but also to motors of a disk type.

Figure 3:
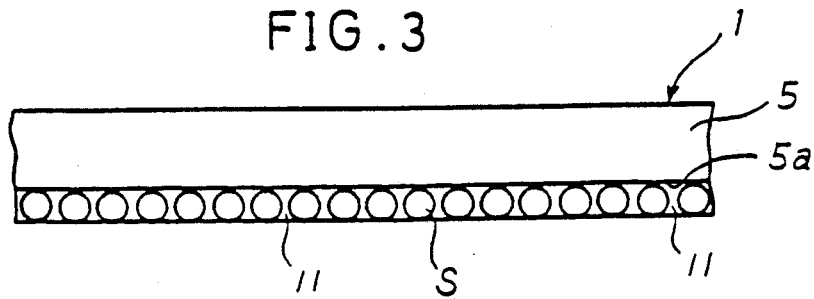
FIG. 3 is a side view of a movable member in another embodiment according to the present invention.
Figure 4:
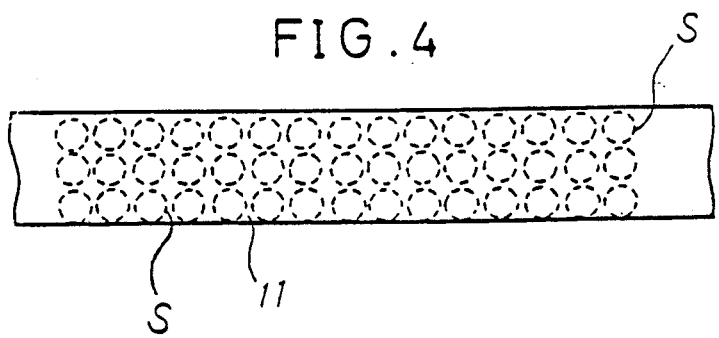
FIG. 4 is a bottom view of a movable member shown in FIG. 3.
Figure 5:
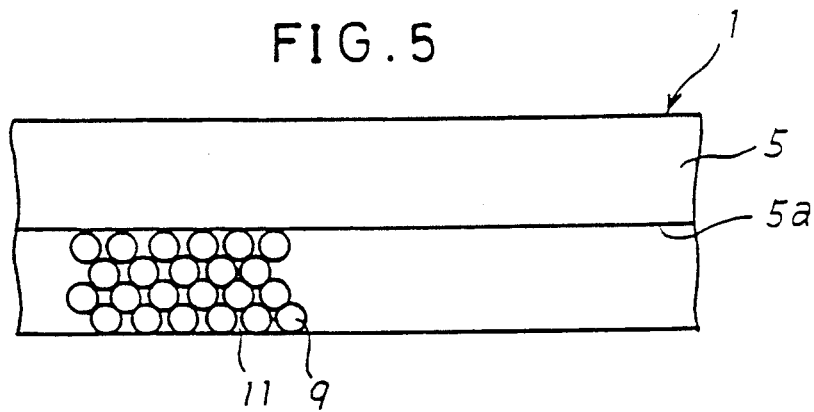
FIG. 5 is a side view of a movable member shown in another embodiment according to the present invention.
Figure 6:
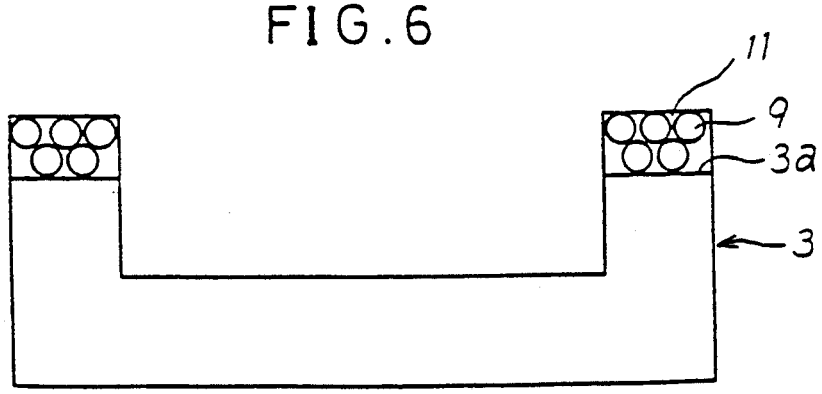
FIG. 6 is a side view of an ultrasonic vibrator in another embodiment according to the present invention.

The anisotropic layer may be provided not on the movable member, but on the ultrasonic vibrator as shown in FIG. 6, or on both the ultrasonic vibrator and the movable member. As an alternative for the anisotropic layer of rods, such a layer can be used with fibers having very small diameters arranged side by side transversely to the pressing direction of the movable member (the direction B of the thickness). Alternatively, the ultrasonic vibrator or the movable member is impregnated in part with a special material so that the ratio between the moduli of longitudinal and transverse elasticity is set at a desired value. The entire movable member also may be formed of such an anisotropic material. As shown in FIGS. 3 and 4, sphere-shaped members S made of a hard material may be scattered in the resin material instead of the rods 9 or, as shown in FIG. 5, rod-shaped members made of a hard material may be stacked or piled in a multilevel high density arrangement of sub-layers. The rod-shaped members 9 in FIG. 5 may alternatively be sphere-shaped members.

Accordingly, variations in the invention can be made without departing from the spirit and scope of the invention as defined in the following claims.

What is claimed is:

1. An ultrasonic motor comprising:
   an ultrasonic vibrator for generating an ultrasonic vibration, said ultrasonic vibrator having a contact surface;
   a movable member movable in a traveling direction and having a contact surface pressed against said contact surface of said ultrasonic vibrator in a pressing direction of said movable member perpendicular to the traveling direction of said movable member; and
   an anisotropic layer made of a composite material including plural components with one of said components being encircled by the other of said components, said anisotropic layer being provided on at least one of the contact surfaces of said ultrasonic vibrator and said movable member, wherein a ratio of a modulus of transverse elasticity of said layer with respect to said traveling direction of said movable member to a modulus of longitudinal elasticity of said layer in the pressing direction of said movable member is smaller than a corresponding ratio of moduli for each of said components.

2. An ultrasonic motor according to claim 1, wherein said layer includes a first component having first moduli of longitudinal and transverse elasticity and a second component having second moduli of longitudinal and transverse elasticity which are smaller than said first moduli, and wherein the modules of longitudinal elasticity of said layer is substantially determined by said first component and the modulus of transverse elasticity of said layer is substantially determined by said second component.

3. An ultrasonic motor according to claim 2, wherein said first component pivots in the traveling direction of said movable member.

4. An ultrasonic motor according to claim 3, wherein said first component is a plurality of elements each having a cylindrical shape with longitudinal axis of each element arranged perpendicular to the traveling direction of said movable member, and wherein said second component is filled in spaces around said plurality of elements of the first component.

5. An ultrasonic motor according to claim 4, wherein the plurality of elements of said first component are stacked in sub-layers in said layer.

6. An ultrasonic motor according to claim 3, wherein said first component is a plurality of elements each having a spherical shape, and wherein said first component is scattered in said second component.

7. An ultrasonic motor according to claim 6, wherein the plurality of elements of said first component are stacked in sub-layers in said layer.

8. An ultrasonic motor according to claim 2, wherein said first component is ceramics and said second component is resin.

9. An ultrasonic motor comprising:
   an ultrasonic vibrator for generating an ultrasonic vibration;
   a movable member having a body movable in a traveling direction;
   a layer provided on said body of said movable member including a first component which has a first modulus of elasticity and pivots in the traveling direction of said movable member and a second component which has a second modulus of elasticity smaller than said first modulus of elasticity and surrounds said first component to encircle the first component, and wherein said movable member is pressed against said ultrasonic vibrator through said layer.

10. An ultrasonic motor comprising:
    an ultrasonic vibrator having a contact surface;
    a movable member movable in a traveling direction and having a contact surface pressed against the contact surface of the ultrasonic vibrator in a pressing direction perpendicular to the traveling direction; and
    an anisotropic layer provided on at least one of the contact surfaces of the ultrasonic vibrator and the movable member, the anisotropic layer comprising a composite material of at least two components, a first component being encircled by a second component and having a modulus of longitudinal elasticity greater than a modulus of longitudinal elasticity of the second component, and the second component having a modulus of transverse elasticity such that the second component elastically deforms in the traveling direction and the first component pivots in the traveling direction when the anisotropic layer is subjected to a shear force.

11. The ultrasonic motor of claim 10, wherein the first component is a plurality of elements.

12. The ultrasonic motor of claim 11, wherein the second component is located in spaces between the elements of the first component.

13. The ultrasonic motor of claim 11, wherein each of the elements constituting the first component has a longitudinal axis arranged in a direction transverse to the traveling and pressing directions.

14. The ultrasonic motor of claim 13, wherein each element of the first component is a rod.

15. The ultrasonic motor of claim 13, wherein each element of the first component is a fiber.

16. The ultrasonic motor of claim 11, wherein the elements of the first component are spherical elements.

17. The ultrasonic motor of claim 10, wherein the movable member is the same anisotropic material as the anisotropic layer.

18. The ultrasonic motor of claim 10, wherein the anisotropic layer has a predetermined ratio of modulus of longitudinal elasticity to modulus of transverse elasticity determined by the corresponding moduli of the first and second components.

19. An ultrasonic motor, comprising:
    an ultrasonic vibrator having a contact surface; and
    a movable member movable in a traveling direction and having a contact surface pressed against the contact surface of the ultrasonic vibrator in a pressing direction perpendicular to the traveling direction;
    at least a portion of one of the movable member and ultrasonic vibrator in contact with the contact surface of the other of the movable member and ultrasonic vibrator being composed of an anisotropic material including plural components with one of said components being encircled by the other of said components, wherein a ratio of the modulus of transverse elasticity of the material with respect to said traveling direction of said movable member to a modulus of longitudinal elasticity of the material in the pressing direction of the movable member is smaller than a corresponding ratio of moduli for each of the components.

* * * * *